(12) United States Patent
Grassia et al.

(10) Patent No.: US 12,672,736 B2
(45) Date of Patent: Jul. 7, 2026

(54) TAMPING ASSEMBLY

(71) Applicant: BREVILLE PTY LIMITED, Alexandria (AU)

(72) Inventors: Robert Grassia, Alexandria (AU); Philip Mcknight, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 1003 days.

(21) Appl. No.: 17/777,373

(22) PCT Filed: Nov. 17, 2020

(86) PCT No.: PCT/AU2020/051241
§ 371 (c)(1),
(2) Date: May 17, 2022

(87) PCT Pub. No.: WO2021/097520
PCT Pub. Date: May 27, 2021

(65) Prior Publication Data
US 2023/0000280 A1     Jan. 5, 2023

(30) Foreign Application Priority Data

Nov. 18, 2019   (AU) ................................ 2019904333

(51) Int. Cl.
*A47J 31/42*          (2006.01)
*A47J 31/06*          (2006.01)
*A47J 31/44*          (2006.01)

(52) U.S. Cl.
CPC ........... *A47J 31/42* (2013.01); *A47J 31/0663* (2013.01); *A47J 31/4403* (2013.01)

(58) Field of Classification Search
CPC ................ A47J 31/0663; A47J 31/0657; A47J 31/4464; A47J 31/0647; A47J 31/42;
(Continued)

(56) References Cited

U.S. PATENT DOCUMENTS 6,095,032 A * 8/2000 Barnett ................... A47J 42/40
                                                            100/145
2016/0128507 A1* 5/2016 Grassia ................... A47J 31/44
                                                            99/287
(Continued)

FOREIGN PATENT DOCUMENTS

AU          2012209041 A1 *  2/2013
AU          2012209041 B2    4/2016
(Continued)

OTHER PUBLICATIONS

Office Action from Chinese Patent Application No. 202080080554.0 mailed Jan. 18, 2024, 9 pages.
(Continued)

*Primary Examiner* — Elizabeth M Kerr
*Assistant Examiner* — Keith Brian Assante
(74) *Attorney, Agent, or Firm* — Quarles & Brady LLP

(57) ABSTRACT

A coffee compacting assembly (22) that receives ground coffee to compact the coffee in a filter cup (25) having a floor (39), the coffee compacting assembly (22) including: an auger (33) having an axis (30) about which the auger (33) is rotated to compact the ground coffee in the filter cup (25), with the auger (33) extending angularly and longitudinally relative to said axis (30); a motor (51) coupled to the auger (33) to rotate the auger (33) about said axis (30); and an auger positioning device (40) engaged with the auger (33) to provide for movement of the auger (33) between a start position and a raised position above the start position, with the start position being predetermined so that the auger (33) is located at a predetermined location within the filter cup (25).

13 Claims, 5 Drawing Sheets

(58) Field of Classification Search
CPC .... A47J 31/4403; A47J 31/4425; A47J 31/34;
A47J 31/4489; A47J 31/46; A47J 31/00
See application file for complete search history.

(56) References Cited

U.S. PATENT DOCUMENTS

| | | | | |
|---|---|---|---|---|
| 2016/0157664 | A1* | 6/2016 | Doglioni Majer ...... | A23F 5/262 |
| | | | | 426/433 |
| 2018/0153330 | A1* | 6/2018 | Abbiati ............... | A47J 31/0657 |
| 2018/0360257 | A1 | 12/2018 | Dionisio et al. | |
| 2019/0216254 | A1 | 7/2019 | Grassia et al. | |
| 2020/0359827 | A1* | 11/2020 | Giorgella ............... | A47J 31/44 |

FOREIGN PATENT DOCUMENTS

| | | | | |
|---|---|---|---|---|
| CN | 108143278 | A | 6/2018 | |
| EP | 0978245 | A1 * | 2/2000 | |
| WO | WO-2008081238 | A2 * | 7/2008 ............... | A47J 31/44 |

OTHER PUBLICATIONS

International Search Report for application No. PCT/AU2020/051241, dated Jan. 22, 2021.

* cited by examiner

TAMPING ASSEMBLY

CROSS REFERENCE TO RELATED APPLICATIONS

This application represents the United States national stage filing of PCT/AU2020/051241, filed Nov. 17, 2020, which claims priority to Australian Provisional Patent Application No. 2019904333, filed Nov. 18, 2019, the contents of which is incorporated herein in its entirety by reference thereto.

TECHNICAL FIELD

The present invention relates to tamping assemblies for coffee machines.

BACKGROUND OF THE INVENTION

Many espresso coffee machines include a grinding assembly, that receives coffee beans, and grinds the coffee beans to a desired fineness. The coffee grounds are then delivered to a tamping assembly with a tamping assembly compacting the coffee grounds in a filter cup. The filter cup will be part of a portafilter comprising the filter cup, a socket that receives the filter cup, and a handle extending from the socket. Typically, the socket would have lateral projections (lugs) that engage the coffee machine group head to retain the portafilter in position.

Typically, the coffee is compacted in the portafilter by a rotatably driven auger. Initially, when the portafilter is engaged with the grinding assembly, the auger is extends into the filter cup, and in cases where the filter cup has less depth than the travel distance of the auger, engages the lower surfaces of the filter cup.

A disadvantage of the above discussed auger and filter cup is that upon rotation of the auger, engagement between the filter cup and the auger may result in damage to the filter cup and/or auger. Additionally, if the coffee grounds are not adequately engaged by the auger, than there will be no vertical movement of the coffee grounds and thus inadequate tamping.

OBJECT OF INVENTION

It is the object of the present invention to overcome or substantially ameliorate the above disadvantage or at least provide a useful alternative to the above discussed auger.

SUMMARY OF THE INVENTION

There is disclosed herein a coffee compacting assembly that receives ground coffee to compact the coffee in a filter cup having a floor, the coffee compacting assembly including:

an auger having an axis about which the auger is rotated to compact the ground coffee in the filter cup, with the auger extending angularly and longitudinally relative to said axis;

a motor coupled to the auger to rotate the auger about said axis; and an auger positioning device engaged with the auger to provide for movement of the auger between a start position and a raised position above the start position, with the start position being predetermined so that the auger is located at a predetermined location within the filter cup.

Preferably, the auger positioning device locates the auger in a start position so as to minimise contact between the auger and filter cup floor.

Preferably, the auger positioning device locates the auger at a position at which it does not contact the filter cup floor.

Preferably, the coffee compacting assembly includes a first shaft, the first shaft being a driven shaft of the motor, and a second shaft, the second shaft being attached to the auger, and being driven by the first shaft, with the second shaft being mounted for longitudinal movement relative to the first shaft.

Preferably, the coffee compacting assembly includes a coupling fixed to the first shaft, and that slidably engages the second shaft and a transmit drive from the first shaft to the second shaft.

Preferably, the auger positioning device includes a bracket engaged with the second shaft, with the bracket moved to provide for longitudinal movement of the second shaft, and therefore the auger.

Preferably, the second shaft passes through the bracket so as to be rotatable relatively thereto.

Preferably, the auger positioning device includes a cam member, moved angularly to provide for adjustment of the start position of the auger.

Preferably, the auger positioning device includes a manual lifting method selected from the set of a threaded shaft, a slider, and a ratchet.

In an alternative embodiment, the auger positioning device includes a positioning motor, a threaded shaft rotatably driven by the positioning motor, with the threaded shaft rotated to cause movement of the second shaft and therefore the auger.

There is further disclosed herein an espresso coffee machine including the above compacting assembly, and a grinding assembly, the grinding assembly providing for the ground coffee to be delivered to the filter cup.

BRIEF DESCRIPTION OF THE DRAWINGS

Preferred forms of the present invention will now be described by way of example with reference to the accompanying drawings, wherein.

DETAILED DESCRIPTION OF THE PREFERRED EMBODIMENTS

Figure 1:
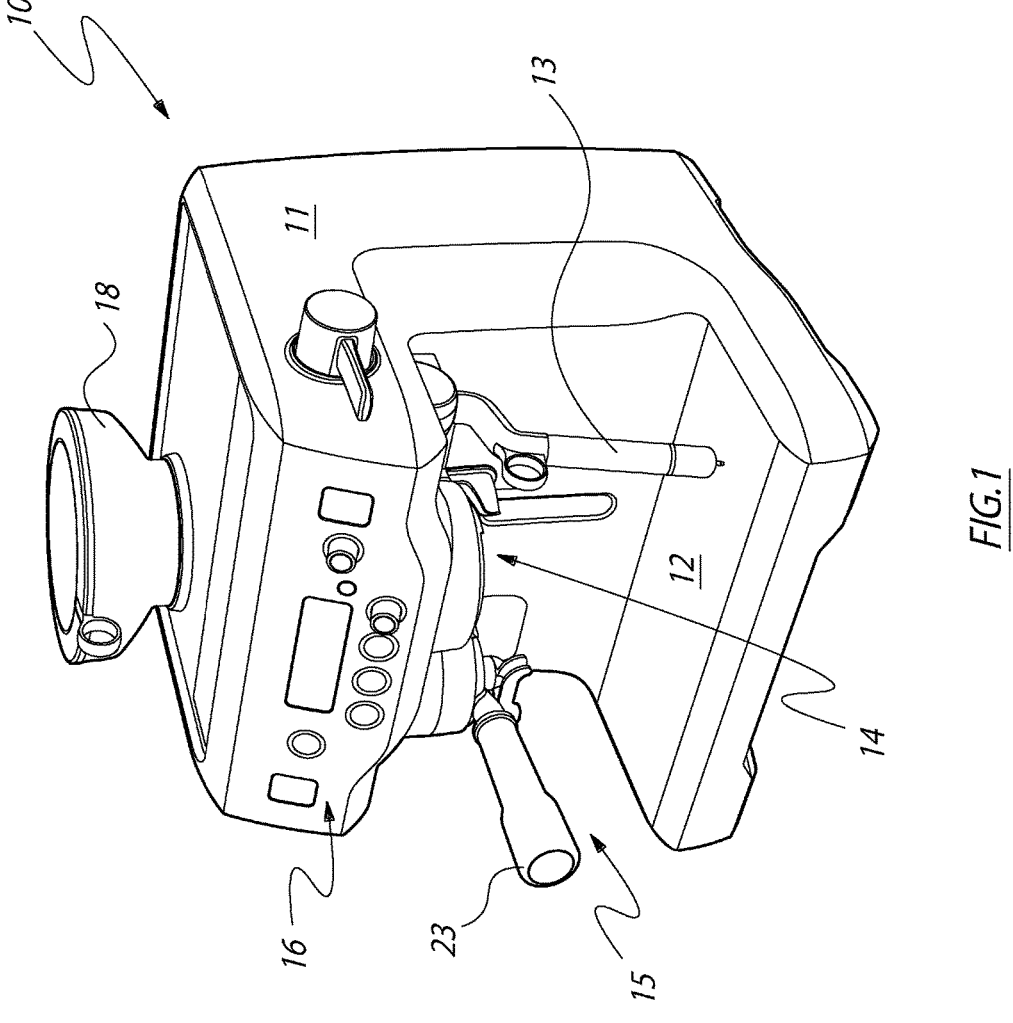
FIG. 1 is a schematic isometric few of a coffee espresso machine.
Figure 2:
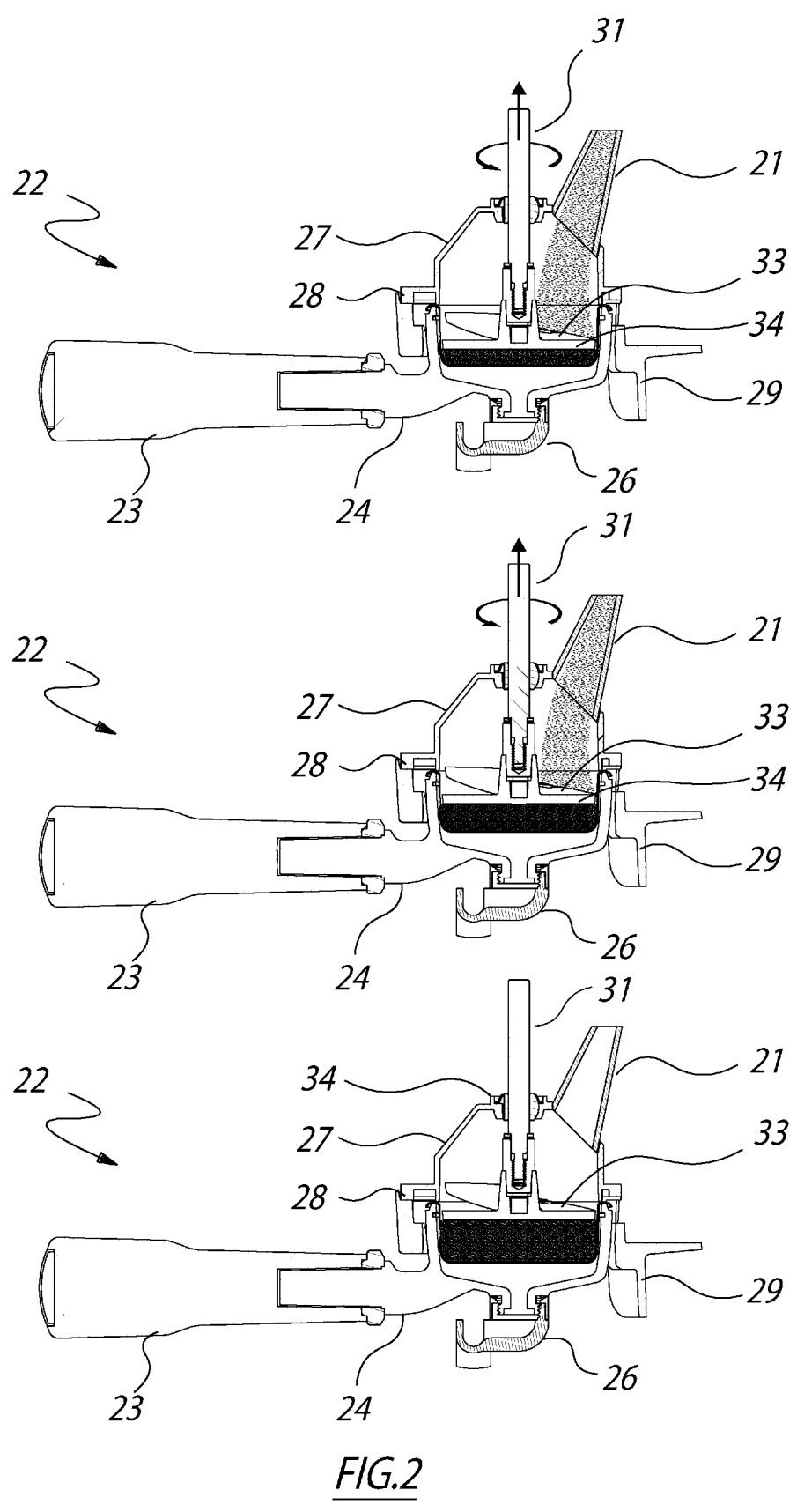
FIG. 2 is a series of schematic sectioned side elevations of the portafilter of the machine of FIG. 1, receiving coffee to be compacted.

In the accompanying drawings there is schematically depicted an espresso coffee machine (10). The machine (10) includes an outer body (11) providing a tray (12).

Mounted in the body (11) is a steam wand (13) to which steam under pressure is delivered, for delivery to a container receiving milk, to froth the milk.

Also mounted in the body (11) is a group head assembly (14) that receives a portafilter (15).

A front face of the machine (10) has user operable items (such as switches or a touch screens) (16) that a user operates to have the machine (10) perform its various functions.

Mounted within the body (11) is a grinding assembly (mill) (17) that includes a hopper (18) that receives coffee beans to be ground. The hopper (18) delivers the coffee beans to a grinding mill (19) including burr grinders driven by a motor (20).

Extending from the mill (19) is a chute (21) that receives the ground coffee and delivers the ground coffee to a coffee compacting assembly (22) and the portafilter (15).

The portafilter (15) includes a handle (23) to the end of which there is fixed a socket (24). The socket (24) provides a cavity (44) that receives a filter cup (25). Coffee is delivered to and compacted within the filter cup (25) by the coffee compacting assembly (22), with the portafilter (15) then disengaged from the assembly (22) and engaged with the group head assembly (14), so that hot water is delivered under pressure to the coffee, to brew the coffee. The brewed coffee exits the portafilter (15) via a drain or spout (26) communicating with the cavity (44).

Typically, the socket (24) would have outward projecting lugs (not illustrated) that engage the assembly (22) to hold the portafilter (15) engaged with the assembly (22). The projections would also engage the group head assembly (14) to secure the portafilter (15) in position when the heated water under pressure is applied to the ground coffee.

Figure 3:
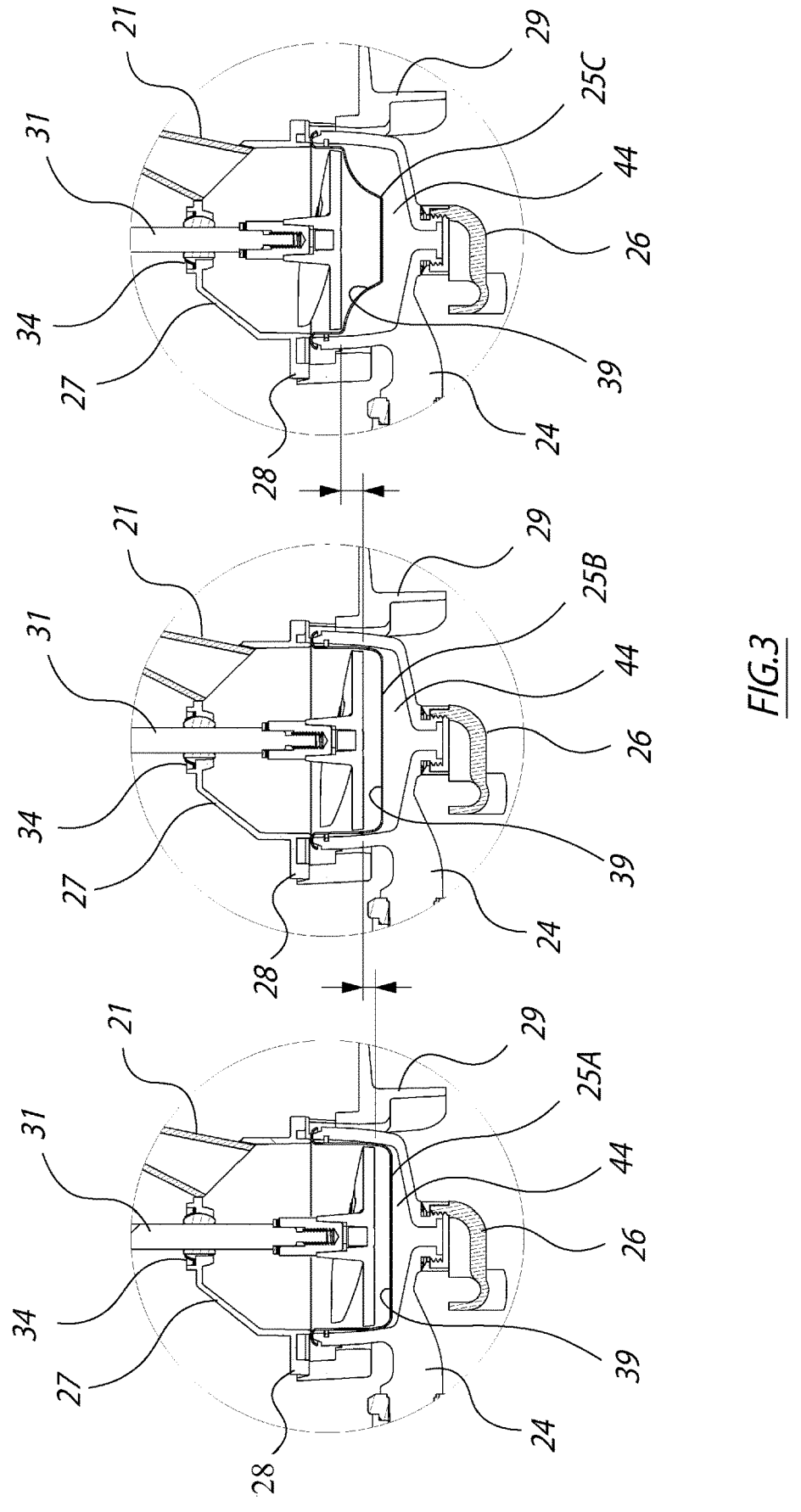
FIG. 3 is a series of schematic sectioned side elevations of various filter cups, used with the espresso machine of FIG. 1, together with a coffee compacting auger.

In this embodiment the machine (10) is provided with three different filter cups (25A, 25B, 25C). As shown in FIG. 3 the largest of the filter cups (25) is the filter cup (25A), an intermediate size filter cup is (25B), while the smallest filter cup is (25C). As a particular example the filter cup (25A) would provide brewed coffee for three cups, the filter cup (25B) would provide brewed coffee for two cups, and the filter cup (25C) would provide brewed coffee for a single cup.

Figures 4, 5:
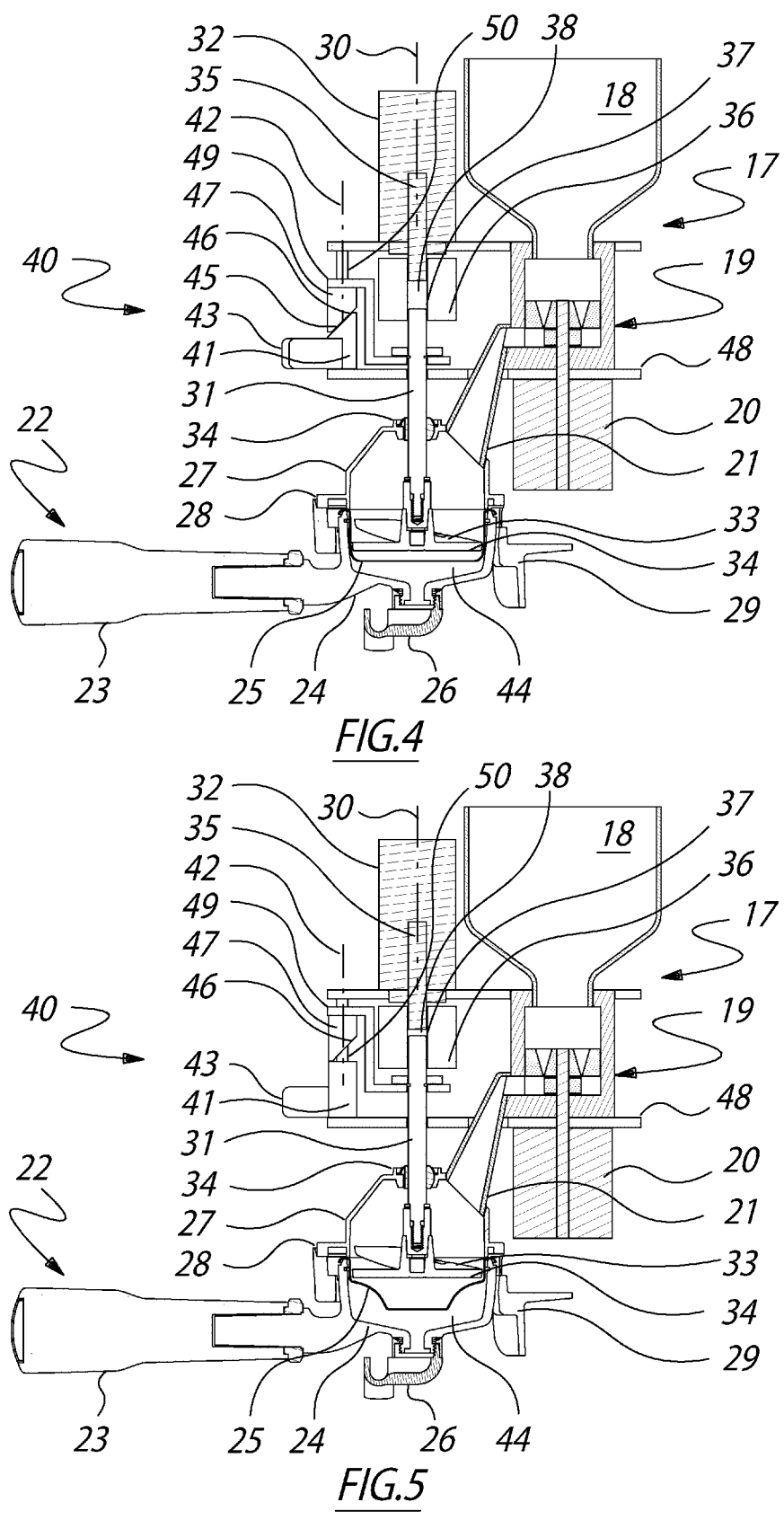
FIG. 4 is a schematic section side elevation of the portafilter of the coffee machine of FIG. 1, together with the grinding and compacting assemblies of the coffee machine of FIG. 1.
FIG. 5 is a further schematic section side elevation of the portafilter, grinding and compacting assemblies of FIG. 4.

In the embodiment of FIGS. 4 and 5, the coffee compacting assembly (22) includes a cover (27), to which the chute (21) is attached, with the cover (27) covering the open upwardly facing filter cup (25). Additionally the cover (27) would have an outwardly extending flange (28). Fixed to the flange (28) is a mounting (29) that engages the socket (24) to secure the socket (24) in position when the coffee is being compacted. Typically, the portafilter (15) would be move angularly about the axis (30) between a release position and an engaged position with respect to the mounting (29).

The coffee compacting assembly (22) includes a driven shaft (31), that is rotated about the axis (30) by means of a motor (32). Fixed to the lower extremity of the shaft (31) is a compacting auger or impeller (33) that includes a spiral fin (34) that extends angularly about the axis (30), and longitudinally relative to the axis (30). The spiral fin (34) extends angularly about the axis (30), so as to go from a lowermost position to an uppermost position anticlockwise, if viewed from above. The motor (32) also drives the shaft (31) anticlockwise, when viewed from above.

The shaft (31) passes through the cover (27) via a bearing and/or seal (34).

The motor (30) has a driven shaft (35) that at its lower end is fixed to a coupling sleeve (36). The coupling sleeve (36) has an internal passage (37) that is splined and slidably receives a splined upper end of the shaft (31), so that the coupling sleeve (36) drives the shaft (31). However, the shaft (31) is moveable longitudinally of the axis (30) within the passage (37) to provide for relative longitudinal movement between the shafts (31) and (35).

Located within the internal passage (37) is a resilient member (for example a spring) (38), that is compressed so as to urge the shaft (31) downward, that is to urge the auger (33) into the filter cup (25), to compact the coffee within the filter cup (25).

As the coffee builds up in the filter cup (25), the auger (33) is moved upward from a start position to a raised finished position. The shaft (31) then travels upward in the coupling sleeve (36).

The spring rate of the resilient member (38) will determine the degree to which the coffee is compressed.

As mentioned previously, the portafilter (15) is adapted to receive one of series of filter cups (25A, 25B, 25C). As best seen in FIG. 3, each of the filter cups (25) has a lower floor (39). The depth of the lower floor (39) varies according to the size of filter cup (25).

In the embodiments, the espresso machine (10) includes, in the coffee compact assembly (22), an auger positioning device (40), that positions the auger (33) adjacent the floor (39) of the selected filter cup (25). In one embodiment the auger (33) engages the floor (39), with minimal pressure, but most preferably the auger (33) is positioned slightly above the floor (39) so that there is no contact. This is the auger start position. Preferably, the auger start position is between 0.5 mm to 15 mm above the floor (39). More preferably, the auger start position is between 1 mm to 10 mm above the floor (39). Most preferably, the auger start position is between 1.5 mm to 5 mm above the floor (39).

In the embodiment of FIGS. 4 and 5, the device (40) includes a user operated cam member (41), that is moveable angularly about the axis (42). The axis (42) is generally parallel to the axis (30).

The cam member (41) includes a tab (handle) (43) that is engaged by the user to cause movement of the member (41) about the axis (42), for example by means of a shaft (50), between a number of identified positions. In the first position, the cam member (41) would locate the auger (33) adjacent the floor (39) of the filter cup (25A). In the second position the auger (33) would be located adjacent the floor (39) of the filter cup (25B), while in the third position the cam member (41) would locate the auger (33) in a third position adjacent the floor (39) of the filter cup (25C).

The cam member (41) has an inclined cam face (45) that engages an inclined cam face (46) of a fixed cam member (47). Both cam faces (45 and 46) are inclined to the axis (42), so that angular movement of the cam member (41) about the axis (46) causes relative movement between the cam members (41 and 47).

Angular movement of the cam member (41) about the axis (42) causes movement of the cam member (47) relative to the bracket (48). However, the cam member (47) engages a further bracket (49), with the further bracket (49) being attached to the shaft (31). However, it should be appreciated that the shaft (31) can slide through the bracket (49). However movement of the bracket (49) causes a corresponding movement in the shaft (31).

Accordingly, by angular movement of the cam member (41) the auger (33) can be located at the desired position relative to the filter cup (25A, 25B, 25C) that has been selected.

Figure 6:
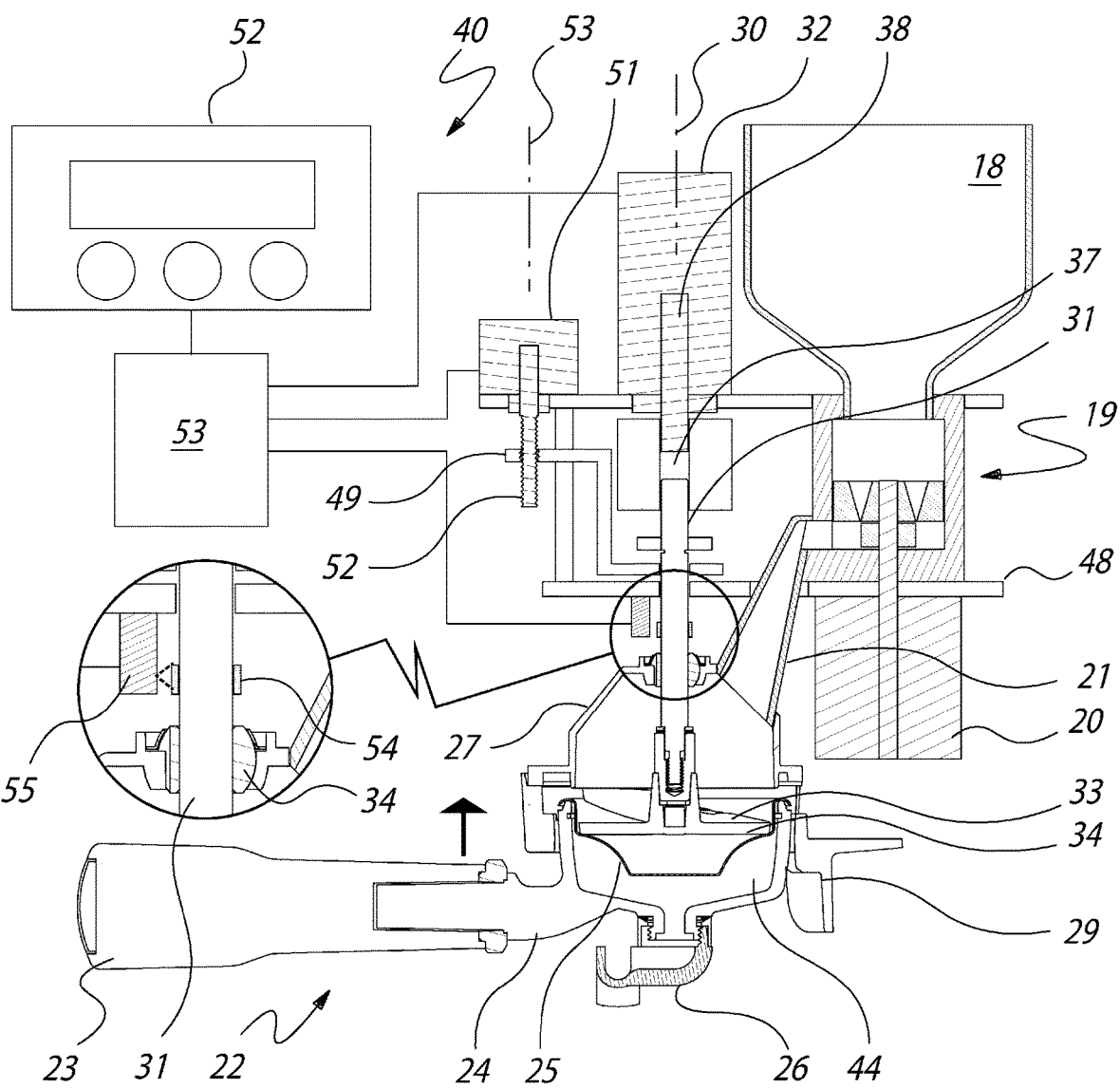
FIG. 6 is a schematic section side elevation of a modification of the portafilter, grinding and compacting assemblies of FIGS. 4 and 5.

In the embodiment of FIG. 6 the device (40) is motorised. In particular, the selector (40) includes a motor (51) that rotates a threaded shaft (52) about the axis (53). The shaft (52) is threadably engaged with the bracket (49), so that operation of the motor (51) causes the bracket (59) to rise or descend. Accordingly, by operation of the motor (51) the shaft (31) is caused to move along the axis (30) to adjust the start height of the selected filter basket (25) selected.

The motor (51) is operated by means for the auger (33) of a control assembly (53) that includes a user operable interface (52), that is operated by the user to select, amongst others, the start height for the auger (33). That is the start height corresponding to the filter cup (25) selected. The user operable interface (52) communicates the selected start height to the control assembly (53) that controls operation of the motor (51) and therefore the movement of the bracket (49). If so required the shaft (31) could be provided with a position indicator (optical or magnetic) (54) that co-operates with a detector (55) that provides information to the computer (53) to aid in operation of the motor (51), and therefore location of the auger (33).

In the above embodiment the raised finished position can be detected by load on the motor (32), or the position of the shaft (31). A signal would be generated to halt operation of the motor (32) when the auger (33) reaches the raised finished position.

The above described preferred embodiments have the advantage of positioning the auger (33) to aid in minimising, and most preferably preventing, contact between the auger (33) and the floor (39) of the selected filter cup (25), thereby reducing the probability of damage due to the contact.

The invention claimed is:

1. A coffee compacting assembly that receives ground coffee to compact the coffee in a filter cup having a floor, the coffee compacting assembly including:

an auger having an axis about which the auger is rotated to compact the ground coffee in the filter cup, with the auger extending angularly and longitudinally relative to said axis;

a motor coupled to the auger to rotate the auger about said axis; and an auger positioning device engaged with the auger to provide for movement of the auger between a start position and a raised position above the start position, with the start position being predetermined so that the auger is located at a predetermined location within the filter cup, wherein the predetermined start position of the auger is adjusted based on the filter cup selected from a series of different filter cups, and wherein the auger positioning device locates the auger in the start position so as to minimise contact between the auger and filter cup floor.

2. The coffee compacting assembly of claim 1, wherein the auger positioning device locates the auger at a position at which it does not contact the filter cup floor.

3. The coffee compacting assembly of claim 1, wherein the coffee compacting assembly includes a first shaft, the first shaft being a driven shaft of the motor, and a second shaft, the second shaft being attached to the auger, and being driven by the first shaft, with the second shaft being mounted for longitudinal movement relative to the first shaft.

4. The coffee compacting assembly of claim 3, wherein the coffee compacting assembly includes a coupling fixed to the first shaft, and that slidably engages the second shaft and a transmits drive from the first shaft to the second shaft.

5. The coffee compacting assembly of claim 3, wherein the auger positioning device includes a bracket engaged with the second shaft, with the bracket moved to provide for longitudinal movement of the second shaft, and therefore the auger.

6. The coffee compacting assembly of claim 5, wherein the second shaft passes through the bracket so as to be rotatable relatively thereto.

7. The coffee compacting assembly of claim 1, wherein the auger positioning device includes a cam member, moved angularly to provide for adjustment of the start position of the auger.

8. The coffee compacting assembly of claim 1, wherein the auger positioning device includes a manual lifting method selected from the set of a threaded shaft, a slider, and a ratchet.

9. The coffee compacting assembly of claim 3, wherein the auger positioning device includes a positioning motor, a threaded shaft rotatably driven by the positioning motor, with the threaded shaft rotated to cause movement of the second shaft and therefore the auger.

10. An espresso coffee machine including the coffee compacting assembly of claim 1, and a grinding assembly, the grinding assembly providing for the ground coffee to be delivered to the filter cup.

11. The coffee compacting assembly of claim 1, wherein the auger positioning device locates the auger at a desired position relative to the filter cup.

12. A coffee compacting assembly that receives ground coffee to compact the coffee in a filter cup, the coffee compacting assembly including:

an auger having an axis about which the auger is rotated to compact the ground coffee in the filter cup, with the auger extending angularly and longitudinally relative to said axis;

a motor coupled to the auger to rotate the auger about said axis; and an auger positioning device engaged with the auger to provide for movement of the auger between a predetermined start position and a raised position, wherein the predetermined start position of the auger is adjusted based on a size of the filter cup, and wherein the auger positioning device locates the auger in the start position so as to minimise contact between the auger and filter cup floor.

13. A method of compacting ground coffee in a filter cup using a coffee compacting assembly, the coffee compacting assembly including an auger having an axis and a motor coupled to the auger, the method including the steps of:

moving the auger to a predetermined start position in which the auger is adjacent a floor of the filter cup, wherein the predetermined start position of the auger is adjusted based on the filter cup selected from a series of different filter cups, wherein an auger positioning device locates the auger in the start position so as to minimise contact between the auger and filter cup floor;

operating the motor to rotate the auger of the coffee compacting assembly about the axis to compact the ground coffee in the filter cup; and moving the auger to a raised position above the predetermined start position.

* * * * *